Aug. 31, 1965          R. HALFTERMEYER          3,204,163
                        VARIABLE CONDENSER
Filed June 13, 1963                              4 Sheets-Sheet 1
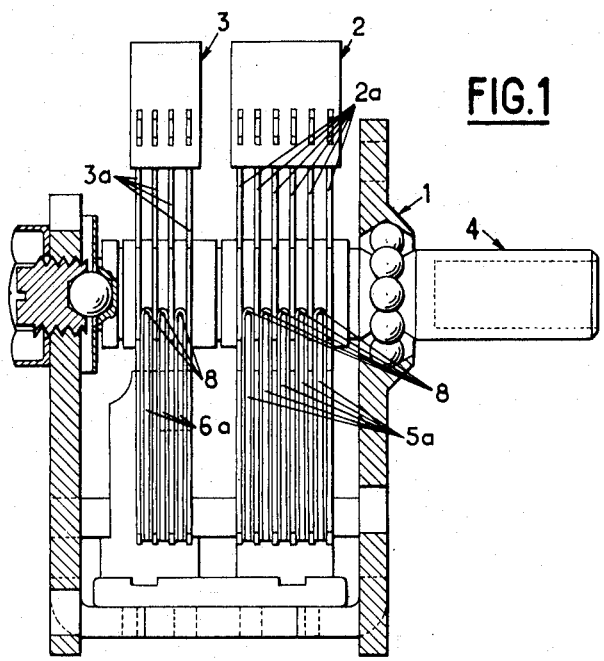
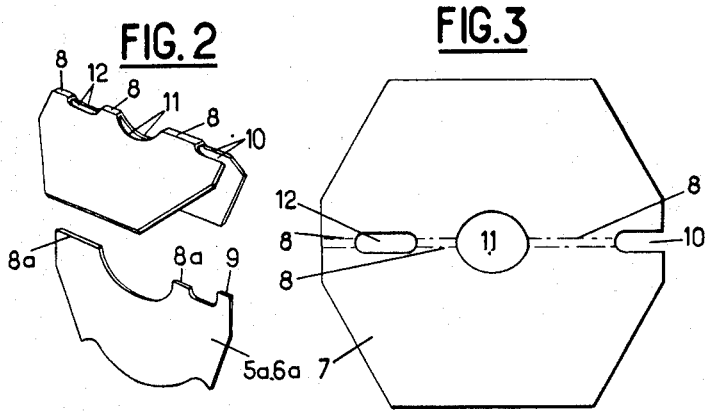
INVENTOR
Rene Halftermeyer
By Holcombe, Wetherill & Brisbois
ATTORNEYS

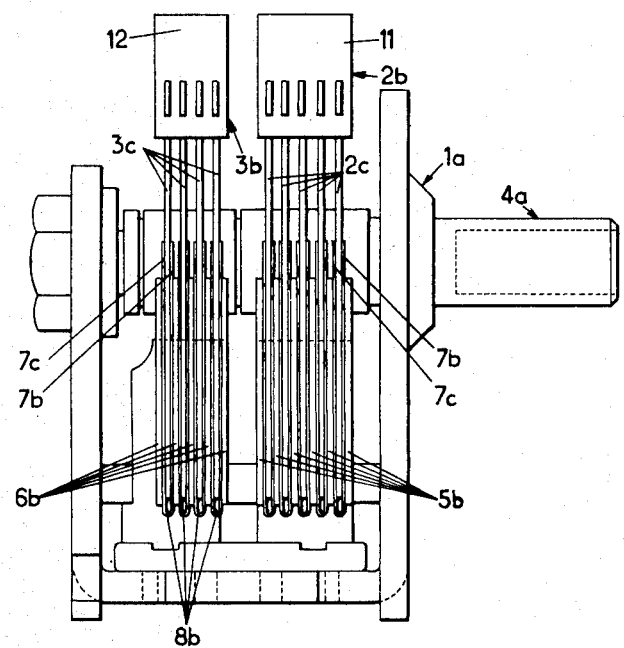

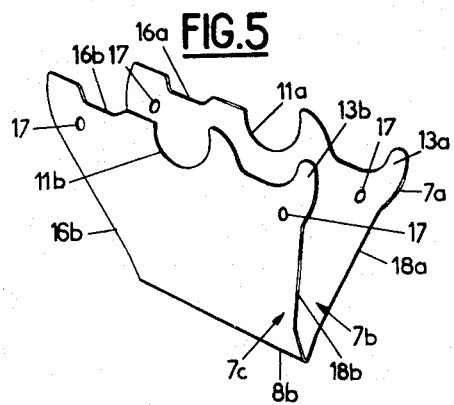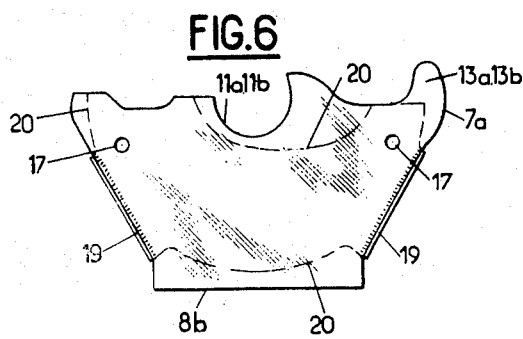

Aug. 31, 1965    R. HALFTERMEYER    3,204,163
VARIABLE CONDENSER

Filed June 13, 1963    4 Sheets-Sheet 4

INVENTOR
Rene Halftermeyer
By Holcomb, Wetherill & Brisebois
ATTORNEYS

United States Patent Office 3,204,163
Patented Aug. 31, 1965

3,204,163
VARIABLE CONDENSER
René Halftermeyer, 35 Ave. Faidherbe a,
Montreuil-sous-Bois, France
Filed June 13, 1963, Ser. No. 287,686
Claims priority, application France, Oct. 23, 1962,
913,173, Patent 1,345,072; Dec. 21, 1962, 919,561,
Patent 1,351,510
4 Claims. (Cl. 317—254)

One of the known methods of reducing the bulk of variable condensers is to replace the air commonly used as a dielectric between the rotor and stator plates with a solid dielectric, which permits the distance between the rotor and stator plates to be reduced.

This procedure substantially reduces the bulk of such variable condensers, not only because the reduction in the distance between the plates is secured without decreasing the breakdown voltage, but also because of the increase in specific capacitance which results, especially when the increase in dielectric constant which results from the use of a solid dielectric is taken into account.

However, the manufacture of variable condensers utilizing solid dielectric presents problems which are difficult to solve.

In certain cases, the dielectric is sprayed onto the stator plates from a spray gun, and it is difficult to produce the rigorously constant coating thickness essential to proper functioning of the condenser at each position which the rotor may assume relative to the stator.

In other cases, the dielectric is provided in the form of thin sheets which are adhesively secured to the two surfaces of the stator plates.

This is a delicate job, because it is necessary to use adhesives which, on the one hand, produce perfect adhesion of the insulating sheets to the stator plates, but which, on the other hand, cause minimal dielectric losses.

Moreover, even when the rotor plates are most carefully spaced relative to the rotor plates, the introduction of a rotor plate between the insulating layers on the two adjacent stator plates is likely to damage the edge of one or the other of these layers, or cause it to come loose.

In other methods of construction, the rotor plates are never moved completely out from between the stator plates, thus avoiding the aforementioned difficulties, since the rotor plates are always properly guided, but in this case the residual capacity of the condenser has a much greater value than in conventional constructions, and the condenser frequently cannot cover a sufficiently broad range of frequencies.

Yet another method of construction consists in using insulating sheets having a surface area approximately twice that of the stator plates and constantly in contact with the rotor plates, regardless of their position relative to the stator.

This arrangement is objectable in that it requires the use of insulating sheets twice as large as necessary to insulate the rotor plates from the stator plates and to yield the maximum specific capacity for the variable condenser.

The present invention largely overcomes these disadvantages and has for its object the provision of a new variable condenser having a solid dielectric and characterized by the fact that said dielectric comprises sheets having a surface substantially twice as large as that of the rotor plates, which sheets are bent in the middle so as to form U-shaped sheaths positioned either around or between two adjacent stator plates, which sheaths may be held stationary by the rotor shaft of said variable condenser, so that no adhesive is needed. The dielectric material may, however, be thermoplastic in nature and bonded directly to a supporting plate along one or more of its edges.

In the first embodiment the portions of the U-shaped sheaths connecting the two halves thereof is pressed by the said shaft over the upper edges of the stator plates.

In a second embodiment, these connecting portions are seated in the spaces between adjacent stator plates, and below the lowest point reached by the stator plates, that is to say, beyond the path of travel of the rotor plates.

In a third embodiment, the said U-shaped dielectric sheaths, instead of being positioned on opposite sides of the respective stator plates and instead of remaining fixed during rotation of the rotor, as in the first embodiment, are positioned on opposite sides of the rotor plates to which they are attached partly by the rotor shaft and partly by the means for mounting the rotor plates on the rotor.

In the first embodiment of the invention, it is necessary to bend the dielectric material forming the U-shaped sheath twice, at sharp, precise angles, so that the rotor plates may move easily between the adjacent forked members.

In this way the shape of a sheath makes it possible to avoid any detrioration of the dielectric during the movement of the rotor, and eliminates the necessity for using removable spacers when mounting the stator in the cage of the variable condenser, the two halves of the sheath themselves serving this purpose.

In the second embodiment of the invention, the sheaths are also fixed with respect to the mounting member carrying the stator plates. The soldering of the stator plates may also involve local fusion of the edges of these halves of the dielectric sheaths positioned on opposite sides of these plates, if the solid dielectric used is thermoplastic in nature, e.g. made of polyethylene or polystyrene.

In this second embodiment of the invention, the two leaves constituting the halves of the dielectric sheaths comprise an upper projection extending beyond the uppermost position of the stator plate, and designed to assist in guiding the rotor plates, when the capacitance of the condenser is near its minimum.

The two leaves of each sheath may also, in this embodiment, be pierced in alignment with orifices in the stator plates, so as to permit the proper spacing of the sheaths in a transverse direction to be ensured by means of small rods passing through the said orifices, which rods are withdrawn after mounting, before the sheaths are fixed to the stator assembly by fusion of the thermoplastic dielectric of which they are made.

In the third embodiment of the invention, the U-shaped members are folded double at sharp angles, so that the edges of the stator plates cannot injure them when the rotor is first engaged with the stator.

It follows that, in this third embodiment, there may be fewer rotor plates than stator plates, all of the dielectric sheaths being positioned within the stator when the stator and rotor are so positioned that the capacitance of the condenser is at its maximum.

The characteristics of the present invention will be better understood from a reading of the following description of three embodiments of variable condensers having plates which are coated in accordance with the invention, which embodiments are described, purely by way of example, without limiting the scope of the invention to the details thereof, and with reference to the accompanying drawings, in which:

FIG. 1 is a vertical elevation, partly in section, showing a first embodiment of the variable condenser having a solid dielectric;

FIG. 2 is a detail view in perspective showing a stator plate and an insulating sheath which may be applied to the two faces thereof, and corresponding to the embodiment of FIG. 1;

FIG. 3 is a plan view of the U-shaped dielectric sheath of FIG. 2 before it is folded at its middle;

FIG. 4 is a schematic elevational view of a second embodiment of the variable condenser having a solid dielectric;

FIG. 5 is a perspective view of a dielectric sheath corresponding to the ones used in the embodiment of FIG. 4;

FIG. 6 is a plan view of the two leaves forming the sheath shown on FIG. 5, showing the position of one of the stator plates between said leaves;

Figure 7:
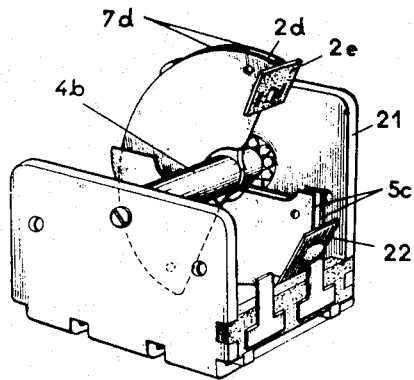
Figure 8:
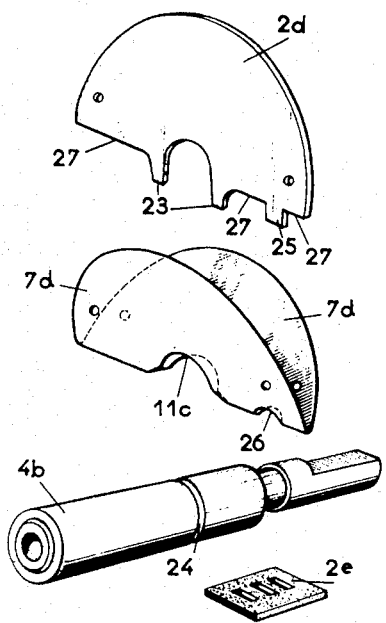

FIG. 7 is a perspective view showing a third embodiment of my new variable condenser utilizing a solid dielectric, comprising a rotor plate projecting part way into the space between two stator plates; and FIG. 8 is an exploded perspective view showing the respective positions of a rotor plate, a U-shaped dielectric sheath, the rotor shaft, and mounting means for the rotor plates of the variable condenser of FIG. 7.

The variable condenser 1, shown on FIG. 1, comprises two rotors 2 and 3 fixed to a control shaft 4. These rotors respectively comprise six plates 2a and four plates 3a which may be inserted between the plates of two stators 5 and 6, the plates of which are designated by reference characters 5a and 6a, and will also embrace the two outer plates of these stators.

The stator plates 5a of the condenser element having the highest capacitance are five in number, whereas the plates 6a are three in number. Each of the stator plates 5a, 6a, visible on FIG. 2, may carry on its upper edge a sheath 7 formed by bending an insulating sheet of the type shown on FIG. 3. This bend is made at 8 in the median plane of the sheet and is mounted on the upper edge 8a of each of the sheets 5a, 6a.

FIG. 2 shows that for reasons not involving the invention, the plate 5a has on one side a projecting portion 9 which extends beyond the edge 8a.

For this reason the U-shaped sheath shown on FIGS. 2 and 3 is provided with a notch 10, which admits the projecting portion 9.

The sheath 7 also comprises a central aperture 11, which, after folding, is positioned against the ungrooved portion of the rotor axis of the variable condenser.

Finally, it will be seen on FIGS. 2 and 3 that the sheath 7 has a third notch 12. This notch is not essential, but in certain cases it permits the rotor mounts to come directly up against the edge 8a of the stator plates instead of abutting against the sheath, because of the thickness of the insulating sheet forming the sheaths, in such a manner as to prevent the rotor from completing its maximum useful rotation.

The variable condenser 1a shown on FIG. 4 comprises two rotors 2b and 3b fixed to a common shaft 4a, said rotors comprising five plates 2c, and four plates 3c which may be respectively inserted between the six plates 5b and the five plates 6b of the two stators.

A U-shaped sheath 7a made of a solid dielectric material having a dielectric constant greater than one is positioned between each pair of stator plates 5b and 6b.

The two halves 7b and 7c of the sheath 7a are both positioned in the spaces between the various plates, 6b or 5b, and on opposite sides of each rotor plate 2c or 3c.

The crease 8b at the lower part of the sheaths 7a, which is best seen on FIGS. 4 and 5, is, once mounted, at a level slightly below the bottom of the stator plates 5b and 6b.

Under these conditions, the double bend at sharp angles of the first embodiment is no longer necessary, since even if the two arms of the sheath become separated by a distance disproportionate to the space available between the stator plates, these arms are nevertheless necessarily spaced at the desired distance in the area between the adjacent stator plates, and it is there, above the level of the fold 8b, that the rotor plates 2c and 3c must turn easily. The two arms 7b and 7c are provided with notches 11a and 11b in their upper parts, which notches receive the rotor shaft 4a.

As has already been indicated, the arms 7b and 7c also carry projections 13a and 13b which guide the rotor plates when these plates are almost completely out from between the stator plates, that is to say, when the assembly plates 11 and 12 for the rotor plates come up against the flat parts 16a and 16b of the sheaths 7a.

It will also be seen that the sheath halves 7b and 7c are pierced by orifices 17 which permit the sheaths to be precisely positioned between the stator plates, before fixing them in place with respect to the stator plate assembly.

Referring now to FIG. 6, it will be seen that the outer edges 18a and 18b of the sheath arms 7b and 7c abut the plate 19 on which the stator plates are mounted. The outline of this plate is shown in broken lines at 20.

The sheaths 7a are mounted by inserting the two arms of the sheath between adjacent pairs of stator plates, positioning them for proper height and width by means of small rods inserted into the orifices 17, before soldering the stator plates on the assembly plates 19, which softens the solid dielectric and fixes the sheaths permanently with respect to the assembly plates 19, in a position in which the two sheath arms have a tendency to separate from each other and press against the stator plates between which said sheaths are positioned.

When mounting the rotor, it suffices to introduce the rotor plates between the two arms of each sheath 7a at the level of the projections 13a and 13b and then slide them on in between the arms of the sheaths until the rotor shaft comes into contact with the notches 11a and 11b.

Referring now to FIG. 7, this figure shows the cage 21 of a variable condenser, two stator blades 5c connected together by mounting means 22 and a rotor plate 2d located between the two halves of a U-shaped dielectric sheath 7d. The rotor plate 2d is attached to the other rotor plates by mounting means 2e.

The plate 2d has been shown in an intermediate position, in which it projects part way into the space between the two stator plates 5c.

If the plate 2d had been shown entirely out from between the stator plates, it would have been obvious that the two dielectric sheets forming the sheath 7d may move freely away from the rotor plate 2d, but that the rotation of the rotor through its shaft 4b simultaneously inserts the two sheets forming the sheath 7d between the two plates of stator 5c, so that these two sheets are automatically positioned to cover the two faces of the plate 2d, at the same time that they cover the inner surfaces of the plates 5c.

Referring now to FIG. 8, it will be seen that the sheath 7d is recessed at 11c so as to pass the two projections 23 on the plate 2d, by means of which the plate 2d is fixed in the groove 24 of the rotor shaft 4b.

It will of course be appreciated that the embodiments which have just been described may be modified as to detail without thereby departing from the spirit of the invention as defined by the following claims.

What is claim it:

1. A variable condenser comprising a rotor shaft member, a set of axially spaced rotor plate members mounted on said rotor shaft member, a set of stator plate members, mounting means on which said stator plate members are positioned so that said rotor plate members may be meshed therewith, and a solid dielectric having a dielectric constant greater than one, said dielectric comprising thin sheets which are folded along their axes of symmetry into sheaths comprising two leaves, each leaf being positioned to separate a rotor plate member from a stator plate member when said rotor and stator sets are meshed, at least two of said members having surfaces which engage only certain portions of said sheaths located along the peripheries of said leaves and mechanically block any movement of those leaves in any direction parallel to said plates, said sheaths being free from said plates except at said engaged portions.

2. A variable condenser as claimed in claim 1 in which both leaves of each sheath are secured in position between the facing surfaces of two adjacent stator plate members, with the edges of said leaves remote from their respective axes of symmetry adjacent the rotor shaft member, one plate member of said rotor set being mounted to slide between the two leaves of each of said sheaths, and the leaves of each sheath being formed with projections which embrace a portion of the rotor plate member therebetween at all positions of said rotor.

3. A variable condenser as claimed in claim 1 in which the two leaves of each sheath are positioned on the opposite sides of a single plate member with the axis of symmetry of that sheath extending along and engaged by an edge of said plate member which intersects said rotor shaft member, and with a portion of each of its leaves adjacent said axis of symmetry being recessed to receive and be engaged by said rotor shaft member, the portions of said leaves remote from their axes of symmetry being free to swing away from those plate members which engage their axes of symmetry.

4. A variable condenser as claimed in claim 3 in which said sheaths are mounted on the stator plate members.

References Cited by the Examiner
UNITED STATES PATENTS

| | | | |
|---|---|---|---|
| 1,337,549 | 4/20 | Fitzgerald | 317—253 |
| 1,495,511 | 5/24 | Fitzgerald | 317—253 |
| 2,956,844 | 10/60 | Wright | 317—253 |

JOHN F. BURNS, *Primary Examiner.*

LARAMIE E. ASKIN, *Examiner.*